June 16, 1942.  E. L. PRIZER  2,286,828

APPARATUS FOR SUPPLYING SOLUBLE AGENTS TO LIQUIDS

Filed Aug. 2, 1940

Eugene L. Prizer,
Inventor

By Alfred W. Knight
Attorney

Patented June 16, 1942

2,286,828

UNITED STATES PATENT OFFICE 2,286,828

APPARATUS FOR SUPPLYING SOLUBLE AGENTS TO LIQUIDS

Eugene L. Prizer, Solana Beach, Calif.

Application August 2, 1940, Serial No. 349,385

2 Claims. (Cl. 299—84)

This invention relates to apparatus for supplying soluble agents to liquids and pertains more particularly to an improved construction which promotes the ready solution of the agent in the liquid, especially in case the soluble agent is in large particles or lumps.

Although my invention is generally applicable to apparatus for supplying soluble agents to liquids it will be described in connection with the supplying of water soluble fertilizing agents to irrigation water, and more particularly in connection with an illustrative form of apparatus for supplying water soluble fertilizing agents to irrigation water applied by the common garden hose, since the problems are in each case substantially the same.

In the general class of apparatus in which this invention lies, the soluble agent is usually supplied in comminuted form, and the particle size is not uniform, since the material usually tends to ball and form lumps. At any rate there are usually fairly large particles present which are difficult to dissolve. Furthermore, the soluble agent is usually contained in a chamber which has a foraminous wall through which the solution leaves the chamber. Besides the difficulty of dissolving the large particles, they generally have a tendency to pile up near the foraminous wall and clog the openings.

It is therefore the principal object of this invention to provide an apparatus of the class described which provides for the rapid dissolving of large particles of the soluble agent and also prevents their clogging the apparatus.

Another object of the invention is to provide a simple, inexpensive and effective apparatus for supplying a water soluble fertilizing agent to irrigation water.

Further objects and advantages of the invention will either be specifically brought out in the ensuing description or will be apparent therefrom.

My invention is best described in connection with the accompanying drawing which illustrates typical embodiments thereof and referring thereto:

Figure 1:
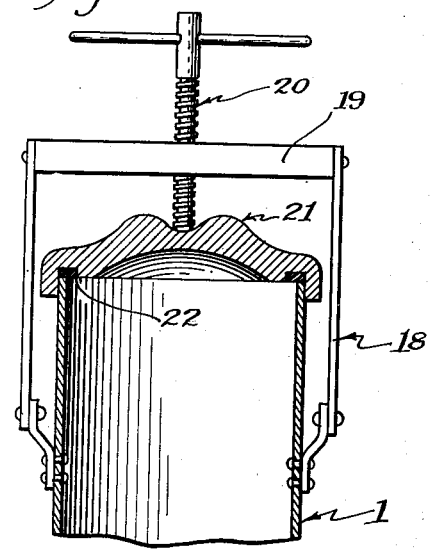
Fig. 1 is a longitudinal vertical section through a typical form of apparatus according to this invention as taken along line 1—1 in Fig. 2.
Figure 2:
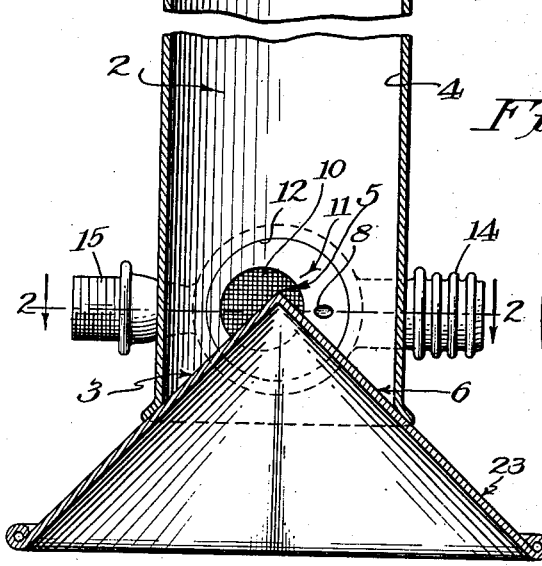
Fig. 2 is a horizontal section thereof taken along line 2—2 in Fig. 1.
Figure 2:
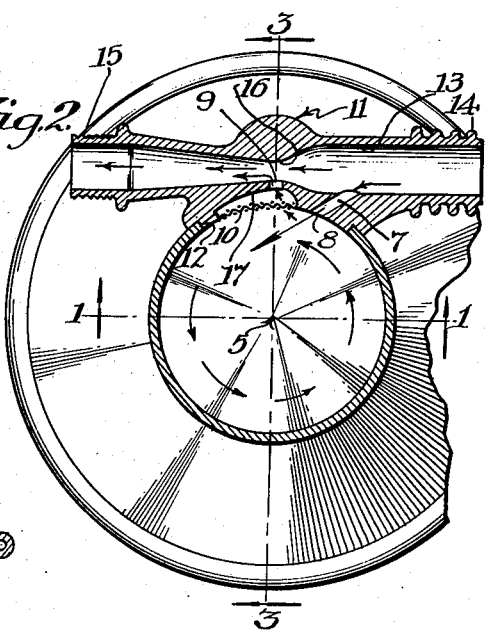

Referring to Figs. 1 and 2 of the drawing, the apparatus is shown as comprising a container 1 of substantially circular cross section providing a chamber 2 for holding a quantity of soluble agent such as a quantity of granular or powdered water soluble fertilizing agent. The container further comprises a bottom wall 3 which is suitably secured in liquid tight engagement with side walls 4 of the container.

The bottom wall 3 has a central portion 5 which is higher than its marginal portion 6 and the bottom wall slopes downwardly and outwardly from the central portion to the marginal portion. In this particular example, the bottom wall is in the form of a cone with its apex defining the central portion of the bottom wall and its axis substantially coinciding with the axis of the chamber 2.

The apparatus further comprises inlet means providing a passage 7 for introducing liquid through an opening 8 into the lower portion of the container at a position upwardly removed from the marginal portion of the bottom wall and in a direction having a substantial tangential component. Means providing a liquid outlet opening 9 communicating with the lower portion of the container is also included, and a foraminous member such as a screen 10 is disposed between the interior of the container and the outlet opening 9.

When the apparatus is used for supplying fertilizer to irrigation water, for example, in connection with a garden hose, it is convenient to incorporate the inlet and outlet means in a single member 11 which has portions extending into an opening 12 in the side walls 4 and is suitably secured to the side walls in liquid tight engagement therewith. The member 11 has a liquid passage 13 extending therethrough and is provided at one end 14 with means such as spaced ridges for attaching a garden hose thereto, usually a permanent connection for a short length of hose to attach the apparatus to a faucet, and is provided at the other end 15 with means such as a threaded connection for attaching the end of a garden hose thereto for discharge of irrigation water with a quantity of fertilizing material dissolved therein.

The passage 13 is provided with a Venturi throat 16 into which the discharge passage 9 opens. The inlet passage 7 communicates with the passage 13 at a high pressure point upstream from the throat 16. The screen member 10 is preferably secured to the member 11 and the member 11 is preferably recessed as at 17 to provide a chamber behind the screen with which the opening 9 communicates.

Figure 3:
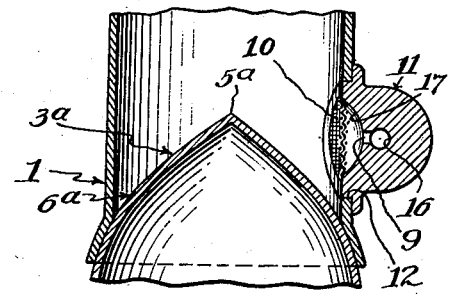
Fig. 3 is a section of such an apparatus taken along a line corresponding to line 3—3 in Fig. 2 and illustrating a modified form of bottom wall.

In Fig. 3 I have illustrated the lower portion of an alternative form of my invention, which, except for the construction of the bottom wall may be exactly the same as the embodiment illustrated in Figs. 1 and 2 and may otherwise be considered as a section along line 3—3 in Fig. 2. In this embodiment of my invention a bottom wall 3a is shown with a central portion 5a which is higher than its marginal portion 6a. The bottom wall slopes downwardly and outwardly from its central portion to its marginal portion. In this case, however, the shape is not truly conical as is the case in Fig. 1, but the bottom wall is curved.

The device is shown provided with a suitable bail 18 having a handle portion 19 by means of which the device may be transported. The handle portion is provided with a hand screw 20 which is adapted upon turning to engage cover member 21 to force it in sealing engagement with the ends of the walls 4 to close the chamber. A suitable gasket may be provided as at 22 to form a tight seal. Suitable base means is provided as at 23 for supporting the apparatus in an upright position. For example, the bottom wall may be continued outwardly past the side walls as shown in Fig. 1 to provide a base.

To operate the device the cover 21 is removed and a desired quantity of a solid soluble material such as finely divided ammonium sulphate, calcium nitrate or the like is placed in the chamber 2 and is supported by the bottom wall 3. The lid is then replaced and the hand screw 20 is placed in engagement with the lid and turned to seat the lid tightly. The end 14 of the passage 13 is placed in communication with a water supply and the end 15 of the passage 13 is placed in communication with the area it is desired to fertilize.

Part of the liquid flowing through passage 13 will discharge through opening 8 and having a substantial tangential component will tend to sweep around the chamber as indicated by the flow lines. It will be noted that the liquid issuing from the opening 8 is directed adjacent and across the inner face of the screen 10. This prevents large particles from settling at the screen and clogging the apparatus and also helps force small particles of the material through the screen. It is to be understood that the openings in the screen are large enough to admit an undissolved particle which is sufficiently small not to clog succeeding parts of the system or to dissolve before being discharged from the hose connected to the end 15 of the passage 13.

There is a tendency for a swirling movement to be obtained in the lower portion of the chamber about the bottom member 3. Large particles or chunks of material which are difficult to dissolve which tend to settle down toward the bottom of the chamber are caused to move downwardly and outwardly along the sloping bottom portion to a position where they are subjected to the swiftest liquid flow and are caused to dissolve more rapidly. At the same time they are kept from settling at the screen.

In the foregoing description and in the claims the use of the term "substantially circular" in connection with the cross-section of the container is meant to include suitable polygonal cross-sections proximating a circular shape, since the desired swirling action can be obtained in such containers and because a circle is in a sense a polygon, being a limiting case thereof. Obviously my invention is susceptible to certain other variations, hence I do not choose to be limited strictly to the above-described examples but rather to the scope of the appended claims.

I claim:

1. In an apparatus for supplying soluble agents to liquids, the combination which comprises: a container of substantially circular horizontal cross-section having a bottom wall adapted to receive and support a quantity of solid soluble agent in divided condition, the central portion of said bottom wall being higher than its marginal portion, said bottom wall sloping downwardly and outwardly from its central portion to its marginal portion; inlet means for introducing liquid into the lower portion of said container at a position upwardly removed from the marginal portion of said bottom wall and in a direction having a substantial tangential component; liquid outlet means; and a screen communicating with the lower portion of said container disposed between the interior of said container and said outlet means.

2. An apparatus as set forth in claim 1, said inlet means being so located with respect to said screen as to direct liquid into said container adjacent and across the inner face of said screen.

EUGENE L. PRIZER.